United States Patent [19]

Pluddemann

[11] Patent Number: 4,961,967

[45] Date of Patent: Oct. 9, 1990

[54] PRIMER COMPOSITIONS

[75] Inventor: Edwin P. Pluddemann, Midland, Mich.

[73] Assignee: Dow Corning Corporation, Midland, Mich.

[21] Appl. No.: 229,666

[22] Filed: Aug. 8, 1988

[51] Int. Cl.$^5$ ............................ B05D 3/06; C08K 5/15
[52] U.S. Cl. ..................................... 427/302; 524/109; 524/114; 524/188; 524/262; 524/292; 525/509; 528/27
[58] Field of Search ................. 427/302; 524/109, 114, 524/262, 188, 292; 525/509; 528/27; 156/329

[56] References Cited

U.S. PATENT DOCUMENTS 4,231,910 11/1980 Plueddemann ............... 260/29.4 R

Primary Examiner—Stanley Silverman
Attorney, Agent, or Firm—Alexander Weitz

[57] ABSTRACT

There is disclosed a primer composition for improving the adhesion between a solid sustrate and a thermosetting or thermoplastic polymer. The composition comprises (A) an epoxy or mercapto functional organosilicon compound, (B) an alkoxymethyltriazine and (C) a difunctional aromatic compound in which the functionality is independently selected from hydroxyl, amino or carboxyl groups. The compositions of the present invention provide substantially improved wet and dry adhesion of polymers to metallic, mineral or plastic substrates.

25 Claims, No Drawings

PRIMER COMPOSITIONS

This invention relates to a primer composition for improving the adhesion between a solid substrate and an organic polymer. More particularly this invention relates to a primer composition comprising an epoxy or mercapto functional organosilicon compound, an alkoxymethyltriazine and a difunctional aromatic compound.

BACKGROUND OF THE INVENTION

Silane coupling agents have long been used as primers in order to promote the adhesion of thermosetting and thermoplastic resins to various substrates. These low molecular weight compounds are believed to form chemical links between the substrate and polymer molecules, and as such, they must incorporate functional groups capable of reacting, or at least associating, with substrate and resin alike. However, the ubiquitous reactivity generally associated with thermosetting resins is ordinarily absent in thermoplastic polymers and this limits the interaction of the latter materials with the organofunctional group of the silane. In other words, thermoplastic polymers generally do not react with the organofunctional group of a silane to form a chemical bond and attempts to bond thermoplastics using silane primers are often disappointing. Moreover, the adhesion of both thermoplastics and thermosets to various substrates is further complicated by the tendency of the bonds formed to rapidly deteriorate When such composites are exposed to moisture.

Particularly useful primer composition for bonding thermoplastics to solid substrates are disclosed by Plueddemann in U.S. Pat. No. 4,231,910, which patent is assigned to the assignee of the present invention and hereby incorporated by reference. These primer compositions consist essentially of 75 to 99 percent by weight of an alkoxymethyltriazine and 25 to 1 percent of an organofunctional trimethoxysilane wherein the organic group contains epoxy or mercapto functionality. Improved dry and wet bond strengths are said to result from use of the compositions.

SUMMARY OF THE INVENTION

It has now been found that the compositions of plueddemann, cited supra, can be further modified with a difunctional aromatic compound, in which the functionality is selected from hydroxyl, amino or carboxyl groups, so as to provide substantially improved wet and dry adhesion of both thermoplastic and thermosetting polymers, such as epoxies, urethanes, poly(vinyl chloride) plastisols and poly(phenylene sulfide) films, to metallic, mineral or plastic substrates.

The present invention therefore relates to a primer composition comprising:

(A) from about 1 to 25 parts by weight of an organosilicon compound selected from the group consisting of 3-glycidoxypropyltrimethoxysilane, 3-mercaptopropyltrimethoxysilane, 2-mercaptoethyltrimethoxysilane, 2-(3,4-epoxycyclohexyl)-ethyltrimethoxysilane and partial hydrolyzates thereof;

(B) from about 99 to 75 parts by weight of an alkoxymethyltriazine which is a product of etherification of a methyloltriazine with a monohydric alcohol having fewer than 5 carbons; and (C) a difunctional aromatic compound having the general formula

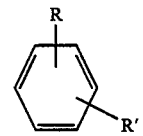

wherein R and R' are independently selected from the group consisting of -OH, -NH$_2$ and -COOH, said difunctional aromatic compound constituting from about 10 to 50 parts by weight for each 100 parts by weight of said organosilicon compound (A) and said alkoxymethyltriazine (B) in said composition.

The present invention further relates to a method of coating a solid substrate with a primer composition to promote adhesion of a polymer to said substrate, the improvement comprising using the above described primer composition.

The present invention still further relates to a method for improving the adhesion of a polymer to an unprimed substrate comprising adding a primer composition to said polymer, the improvement comprising using as said primer the above described composition.

DETAILED DESCRIPTION OF THE INVENTION

In accordance with the present invention, the primer composition contains (A) an organosilicon compound, (B) an alkoxymethyltriazine and (C) a difunctional aromatic compound as described infra.

The organosilicon compound (A) can be 3-glycidoxypropyltrimethoxysilane, 2-(3,4-epoxycyclohexyl)-ethyltrimethoxysilane, 2-mercaptoethyltrimethoxysilane or 3-mercaptopropyltrimethoxysilane, these being well known and commercially available compounds. In addition, partial hydrolyzates of these silanes can be utilized in the primer compositions. The term "partial hydrolyzate" herein is meant to imply that the silane has been hydrolyzed with water, but that a detectable amount of hydroxyl or methoxy groups remain uncondensed in the composition. When partial hydrolyzates are so utilized, it is preferable that one such group remains uncondensed for every four silicon atoms of the organosilicon compound. When the primer composition is to be stored some time before use, it is preferred to employ 3-glycidoxypropyltrimethoxysilane (also referred to as gamma-glycidoxypropyltrimethoxysilane herein) in the primer composition for improved stability.

The second component (B) of the primer composition is an alkoxymethyltriazine. Alkoxymethyltriazines that are preferred are products of etherification of methyloltriazines with a monohydric alcohol having fewer than 5 carbon atoms (i.e., 4 carbons or less) and may include completely etherified products such as hexamethoxymethylmelamine and tetramethoxymethylbenzoguanamine or partially etherified products such as pentamethoxymethylmethylolmelamine, diethoxymethyldimethylolbenzoguanamine and tetrabutoxymethyldimethylolmelamine. A mixture of completely and partially etherified products may be employed. The alkoxymethyltriazines are commercially available products which are well known as acid catalyzed crosslinking agents for thermosetting epoxy and alkyd resins. The highly etherified alkoxymethyltriazines with greater than about 90 percent of the methylol groups etherified are more stable and are preferred for producing more stable primer compositions.

The difunctional aromatic compound (C) of the present invention has the general formula

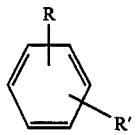

wherein R and R' are each independently selected from the group consisting of -OH, -NH$_2$ and -COOH. The hydroxyl, amino and carboxyl groups of component (C) may be permuted in any combination and the groups may be placed in ortho, meta or para positions with respect to one-another. Preferably, component (C) is selected from isomers of aminophenol or aminobenzoic acid, the meta or ortho isomers being preferred in such cases.

The primer compositions of the present invention are prepared by mixing from about 1 to 25 parts by weight of the organosilicon compound (A), from about 99 to 75 parts by weight of the alkoxymethyltriazine (B), and, based on a total of 100 parts by weight of components (A) plus (B), from about 10 to 50 parts by weight of the difunctional aromatic compound (C). The above proportions are based on the non-volatile (i.e., "solids") content of each component and this provision must be taken into consideration when, e.g., commercial alkoxymethyltriazines are supplied in solvents such as isopropanol, butanol and xylene. The order of addition of the components is not believed to be critical.

Although it is within the scope of the present invention to mix the components at room temperature, it is preferred that mixing be carried out at elevated temperatures and in the presence of a compatibilizing solvent (D). By "compatibilizing" it is meant herein that this solvent is capable of rendering the mixture of components (A) through (C) mutually compatible when these components are either blended at room temperature or mixed at elevated temperatures, as judged by the formation of a clear solution. In this regard, it has been found that lower ketones such as acetone, alcohols, such as methanol, ethanol, 2-propanol, n-butanol and 1-methoxy-2-propanol, methyl pyrrolidone and dimethylformamide, inter alia, are suitable solvents. Particularly preferred solvents include methanol and linear alcohols having 8 to 10 carbon atoms.

The amount of solvent (D) used is preferably at least sufficient to provide a clear final primer solution. This quantity will be readily determined through routine experimentation by the skilled artisan.

In preferred embodiments of the present invention, the primer composition contains from 5 to 20 parts by weight of gamma-glycidoxypropyltrimethoxysilane, from 95 to 80 parts by weight of hexamethoxymethylmelamine and, based on 100 parts of the previous two ingredients, from 10 to 50 parts by weight of 3-aminophenol or 2-aminobenzoic acid. These systems are preferably heated with an approximately equal weight portion of compatibilizing solvent to obtain clear solutions. Thus, when a low boiling alcohol such as methanol is used as the solvent, it is preferred to mix the components under reflux therein. Alternatively, when higher boiling alcohols, such as the above mentioned linear alcohols having 8 to 10 carbon atoms are employed, heating to a temperature of about 50° C. to 80° C. is sufficient to obtain a clear solution.

The present invention also relates to methods of using the above described primer compositions to promote the adhesion of thermoplastic and thermosetting polymers to various metallic, mineral or plastic substrates. Such substrates may comprise glass, metals having an oxide surface thereon, mica, asbestos, clay, vitreous enamel, silicon, silicon carbide, alumina, ceramics and plastics such as nylon, polyethylene terephthalate, polycarbonates and polymethy methacrylate.

Methods for using primers are well known in the art. Typically, the surface of a substrate is coated (wetted) by the primer composition by dipping, brushing, spraying, or wiping, for example. The primer composition may be applied from solution or dispersion, the preferred method being application from an alcohol solution at about a 10% (by weight) concentration. Suitable solvents may be selected from methanol, ethanol, isopropanol, butanol, 1-methoxy-2-propanol, acetone, methyl ethyl ketone, methyl pyrrolidone, inter alia. Additionally, it has been found that aqueous alcohol mixtures of the primer compositions can also result in stable solutions. After application of the primer composition, the primed surface is usually dried to remove any solvent or water employed.

Thermosetting polymers are applied to the primed surfaces from solution, or in a liquid state, and subsequently cured thereon (e.g., by heating, reaction with atmospheric moisture, etc.) by well known methods in the art. Examples of such systems include epoxies, urethanes, polyimides, phenolics and alkyds.

Thermoplastic polymers may be applied from aqueous emulsion (i.e., latexes) or fused onto the primed surface at a temperature sufficient to melt the polymer. The thermoplastics which may be bonded to solid substrates with the primer compositions of the present invention include, among others, poly(vinyl chloride), poly(vinylidene fluoride), nylon, poly(phenylene sulfide), polycarbonates, polyimides, polyetheretherketone, poly(vinyl acetate). acrylic polymers and copolymers, polystyrene and copolymers thereof as well as the thermoplastics enumerated by Plueddemann, cited supra. The primer compositions of the present invention have been found particularly suitable as adhesion promoters for polymers such as poly(phenylene sulfide), poly(vinylidine fluoride) and poly(vinyl chloride) plastisols.

While not wishing to be bound by a particular theory or mechanism, it is believed that little or no reaction of the various components of the present invention is required as demonstrated in such room temperature curing systems as polysulfide and epoxy. Reaction may, however, occur during the above described fusion step wherein thermoplastics are bonded to a primed substrate.

Alternatively, according to yet another aspect of the present invention, the primer compositions may be uniformly dispersed in a thermoplastic (or thermoset) polymer and this combination fused (or cured) onto an unprimed substrate. In this case, from about 0.5 to 2.0 parts by weight of the primer composition (on a solids basis) is generally added to the polymer. This method of the present invention is particularly suitable in the modification of plastisols, such as poly(vinyl chloride) (PVC) plastisols, plasticized PVC, rigid PVC and latex polymers, such as water-based emulsions of poly(vinyl acetate).

EXAMPLES

The following examples are presented to illustrate the invention to those skilled in the art and should not be construed as limiting the invention, which is properly delineated in the appended claims. All percentages and proportions are on a weight basis unless indicated to the contrary.

The following materials were employed in the examples: CYMEL 303 and CYMEL 325 are described as liquid grade hexamethoxymethylmelamines available from American Cyanamid Company (Wayne NJ).

SILANE A is an alkoxysilane having the structure

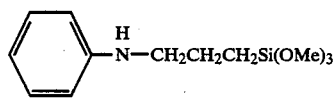

in which Me denotes a methyl radical.

SILANE B is 3-aminophenoxypropyltrimethoxysilane.

Z-6030 is described as a gamma-methacryloxypropyltrimethoxysilane coupling agent (Dow Corning Corp., Midland, MI).

Z-6032 is described as a 40% by weight solution in methanol of N-beta-(N-vinylbenzylamino)ethyl-gamma-aminopropyltrimethoxysilane monohydrogen chloride (Dow Corning Corporation, Midland, MI). 0565 Vinyl Dispersion Resin is described as a poly(vinyl chloride) powder designed for preparation of plastisols (Tenneco, Houston, TX)

JAYFLEX is described as a PVC plasticizer consisting essentially of di-isodecyl phthalate (Exxon Chemical Co., Houston, TX).

HALBASE-10 is described as a stabilizer for PVC (Hammond Lead Products, Inc., Hammond, IN).

EPAL 8-10 is described as a blend of linear alcohols having 8 and 10 carbon atoms (Ethyl Corp., Houston, TX).

RYTON is described as a powdered poly(phenylene sulfide) polymer obtained from Phillips 66 Co., Bartlesville, OK).

RES 6212 is described as a poly(vinyl acetate) homopolymer emulsion obtained from Union Chemical Div., Union Oil of California, Schaumburg IL.

(Comparative) Example 1

A blend of about 10 parts of 3-glycidoxypropyltrimethoxy silane and about 90 parts of CYMEL 303 was prepared according to the disclosure of U.S. Pat. No. 4,231,910, cited supra.

(Comparative) Example 2

A blend of about 10 parts of 3-glycidoxypropyltrimethoxy silane and about 90 parts of CYMEL 325 was prepared according to the disclosure of U.S. Pat. No. 4,231,910, cited supra.

(Comparative) Example 3

A 50/50 blend of the primer of (Comparative) Example 1 and 2,2-diethyl 1,3-propanediol was diluted with methanol to form a 20% solution therein.

(Comparative) Example 4

A reaction product consisting of 40 parts of CYMEL 303, 10 parts of 3-aminophenol and 50 parts of methanol, having no silane, was prepared by refluxing this mixture for four hours to obtain a clear red solution.

(Comparative) Examples 5-7

A reaction product containing no melamine resin (i.e., CYMEL) was prepared by mixing 25 parts of 3-glycidoxypropyltrimethoxysilane, 11 parts of 3-aminophenol and 36 parts of methanol. This mixture was then refluxed for 8 hours to obtain a dark amber solution (Comparative Example 5).

The above procedure was repeated wherein 4-aminophenol was substituted for the 3-aminophenol (Comparative Example 6).

The above procedure was again repeated using 2-aminophenol to obtain a very dark solution (Comparative Example 7).

Examples 1-3

Forty parts of the composition of (Comparative) Example 1, 10 parts of 3-aminophenol and 50 parts of methanol were mixed under reflux for four hours. The water-white solution became light amber during reflux and continued to darken upon exposure to air (Example 1).

A similar procedure, using 2-aminophenol instead of the 3-aminophenol, resulted in a dark amber solution that was black after a few days storage (Example 2).

The above procedure was repeated using 4-aminophenol. The mixture did not become completely compatible after a 12 hour reflux and some crystals (4-aminophenol) separated from a dark amber solution (Example 3).

Examples 4-5

The procedure of Examples 1-3 was followed wherein 10 parts of 3-aminobenzoic acid, 40 parts of the composition of (Comparative) Example 1 and 50 parts of methanol were mixed under reflux for 4 hours to recover a very light colored clear solution (Example 4).

The above was repeated using 10 parts of 4-aminobenzoic acid to obtain a light colored clear solution from which some crystals of 4-aminobenzoic acid separated upon cooling (Example 5).

Example 6

Forty parts of the composition of (Comparative) Example 2, 10 parts of 2-aminophenol, 50 parts of methanol and 0.25 part of diethylhydroxylamine were warmed while stirring and then held under reflux for 5 minutes. This mixture was cooled to obtain a clear red solution.

Example 7

A mixture of 40 parts of the composition of (Comparative) Example 1, 10 parts of 3-aminophenol and 50 parts of EPAL 8-10 was warmed while stirring. The mixture became clear at about 80° C. and resulted in a clear stable solution at room temperature.

Examples 8-9

A mixture of the composition of (Comparative) Example 1 and 3-aminophenol in a ratio of 70/30, respectively, was prepared as a 50% solution in EPAL 8-10 by warming briefly to 80° C. (Example 8).

Similarly, a mixture of the composition of (Comparative) Example 2 and 3-aminophenol in a ratio of 70/30, respectively. was prepared by cold-blending a 5% solution in dipropyleneglycol monomethyl ether (Example 9).

Example 10

A mixture of the composition of (Comparative) Example 1 and 2-aminobenzoic acid in a ratio of 70/30, respectively, was prepared as above by cold-blending a 50% solution in methanol.

The above described compositions were evaluated as adhesion promoters for a poly(vinyl chloride) plastisol. The PVC plastisol was prepared by mixing 100 parts of 0565 Vinyl Dispersion Resin, 90 parts of JAYFLEX plasticizer and 2 parts of HALBASE-10 stabilizer in a WARING blender.

Glass microscope slides were primed by wiping a thin film of the primer solutions onto the slides and air-drying for 15 minutes. A PVC plastisol film having a thickness of about one millimeter was then fused onto each primed slide for 7 minutes at 175° C. The resulting plasticized PVC film was tested for adhesion at room temperature and after soaking the composite for one day in room-temperature water. The 90 degree peel values, reported in kilograms for one inch-wide film, are presented in Table 1. In this table, films that could not be peeled were rated as "c" (i.e., cohesive failure of the plastisol at about 6 to 8 Kg per inch width).

TABLE 1

| Primer Composition | Adhesion to Glass (Kg per inch width) | |
|---|---|---|
|  | Dry | Wet (1 day) |
| (Comparative) Example 1 | 0.3 | (Fell Off) |
| (Comparative) Example 4 | 4 | 0.1 |
| (Comparative) Example 5 | 1.1 | 0.7 |
| (Comparative) Example 6 | 0.7 | 1.2 |
| (Comparative) Example 7 | 2.0 | 2.0 |
| Example 1 | c | c |
| Example 2 | c | c |
| Example 3 | 1.7 | 1.3 |
| Example 4 | 0.5 | 0.3 |
| Example 5 | 0.7 | 0.5 |
| Example 6 | 1.5 | 0.4 |
| Example 9 | c | c |

It is apparent from the above results that, for the PVC plastisol, primer compositions of the present invention containing aminophenol isomers (Examples 1, 2 and 9) imparted superior adhesion to glass substrates. In any event, the present compositions offered improved adhesion over the prior art composition of (Comparative) Example 1 in this system.

Different percentages of the composition of Example 7 (i.e., including solvent) were thoroughly dispersed in the above described PVC plastisol and films were fused onto unprimed 8lass slides for 7 minutes at 175° C. Adhesion was observed at room temperature and after soaking in water for one day, as shown in Table 2.

TABLE 2

| Percent of Example 1 Primer in PVC Plastisol | Adhesion to Unprimed Glass (Kg per inch width) | |
|---|---|---|
|  | Dry | Wet (1 Day) |
| None | 0.1 | (Fell Off) |
| 0.1 | 1.2 | 0.3 |
| 0.25 | c | c |
| 0.5 | c | c |
| 1.0 | c | c |

The above described primer/plastisol mixture containing 0.5% of the primer of Example 1 was fused against unprimed metal coupons for 7 min. at 175° C. Results of peel testing are presented in Table 3, wherein adhesion values are also reported for the same substrates which were first primed with a methanol solution of the composition of Example 1.

TABLE 3

| Metal Substrate | Unprimed Adhesion Using Plastisol Mixture Containing 0.5% of the Composition of Example 1 (Kg per inch) | | Primed Adhesion Using the Composition of Example 1 to Prime Surface (Kg per inch) | |
|---|---|---|---|---|
|  | Dry | Wet (1 day) | Dry | Wet (1 day) |
| cold rolled steel | c | c | 2.5 | 1.6 |
| stainless steel | c | c | c | 5.5 |
| Ni-plated steel | c | 4.0 | 2.1 | 0.3 |
| Cr-plated steel | c | c | c | c |
| Brass | c | c | c | c |
| Solder on brass | 5.0 | 5.5 | c | 2.0 |
| Aluminum | 3.0 | 2.0 | c | c |
| Zn-coated steel | 5.5 | 4.8 | — | — |
| Titanium | c | c | c | 3.0 |

In all cases, it was found that adhesion could be improved by fusing the plastisol for longer periods or at a higher temperature. It was further observed that such plastisol films containing compositions which employed the EPAL 8-10 as solvent formed smooth bubble-free films. On the other hand, films containing primer which used methanol as the solvent resulted in "bubbling" of the plastisol during fusion.

The influence of the ratio of the components of the present invention on adhesion promotion was studied by cold blending a 10% solution of 3-aminophenol in methanol with a 10% solution of the composition of (Comparative) Example 1 in methanol in the ratios indicated in Table 4. Microscope slides were primed, air-dried for 15 minutes, coated with PVC plastisol and tested as described above.

TABLE 4

| Ratio of (Comparative) Example 1 to 3-aminophenol in Primer Composition | Adhesion (Kg per inch) | | | | |
|---|---|---|---|---|---|
|  | (fused 7 min. at 165° C.) | | | (fused 7 min.) at 175° C.) | |
|  | Dry | Wet (1 day) | Wet (10 days) | Dry | Wet (2 days) |
| 100/0 | 0.7 | 0.4 | 0.1 | 0.6 | 0.1 |
| 95/5 | 1.2 | 1.2 | — | 3.0 | 3.0 |
| 90/10 | 2.0 | 2.3 | 2.2 | c | c |
| 80/20 | 5.0 | 4.0 | 4.0 | c | c |
| 70/30 | c | c | c | c | c |
| 50/50 | 6.0 | 4.5 | — | c | c |
| 10/90 | 2.0 | 2.0 | 0.3 | 2.0 | 3.5 |
| 0/100 | 0.7 | 1.2 | 0.3 | 2.0 | 0.5 |

(c = cohesive failure in polymer film at over 6 Kg/inch)

The above described PVC plastisol was modified by dispersing therein 1.0% of the compositions of Examples 8 and 9. These modified plastisols were fused (7 min./175° C.) onto the substrates shown in Table 5. Adhesion to the substrates was measured dry, and after soaking in room-temperature water for 1 to 5 days. An unmodified control plastisol was also tested and results included in Table 5, wherein adhesion is reported in Newtons/cm for a 90° peel.

TABLE 5

| Substrate | Control (Unmodified Plastisol) (Dry) | 1.0% Example 8 in Plastisol Dry | 1.0% Example 8 in Plastisol Wet (1 day) | 1.0% Example 9 in Plastisol Dry | 1.0% Example 9 in Plastisol Wet (1 day) | 1.0% Example 9 in Plastisol Wet (5 days) |
|---|---|---|---|---|---|---|
| KAPTON (polyimide) | 0.1 | c | c | c | 15.4 | 12.7 |
| PEEK[1] | 0.3 | 15.4 | 5.8 | c | c | c |
| Nylon | 0.2 | 11.5 | 1.9 | 13.5 | 2.0 | — |
| MYLAR (polyester) | 0.2 | 19.2 | 1.6 | c | 5.0 | — |
| Glass | nil | 12.3 | 15.4 | c | c | c |
| Aluminum | poor | c | c | c | c | c |
| c.r. steel | nil | 15.4 | 14.6 | c | c | 20.0 |
| stainless steel | nil | c | c | c | c | c |
| Nickeled steel | nil | 20.0 | 16.5 | c | c | c |
| Chromed steel | nil | 15.4 | 15.4 | c | c | c |
| Zn galv. steel | nil | 11.5 | 5.8 | c | c | 11.5 |
| Brass | nil | c | 15.4 | c | c | c |
| Copper | poor | c | c | c | c | c |
| Titanium | nil | 9.6 | 14.2 | c | 20.0 | 12.3 |

[1]PEEK = polyetheretherketone

Glass microscope slides were primed with the primer solutions shown in Table 6 and heated on a 300° C. hot plate for 5 minutes, whereupon powdered PYTON (PPS) polymer was fused onto the surface, resulting in a smooth coating of the polymer. Additionally, primed glass microscope slides were dried for 30 min. in a 100° C. oven, coated with an emulsion of poly(vinylidene fluoride) (PVIF) and heated for 5 minutes at 230° C.

The RYTON and PVIF coatings were tested for initial adhesion by prying or scraping the films from the glass slides using a razor blade. Slides were also submerged in water (room temperature) for one day. In each case, adhesion of the polymer to the primed glass was monitored using the following rating scheme:

| Rating | Observation |
|---|---|
| nil | Fell off (Dry) or Floated free of glass slide (Wet) (adhesive failure). |
| fair | Could be removed in one piece with razor blade (adhesive failure). |
| good | Could be pried off in pieces (adhesive and cohesive failure). |
| excellent | Could not be removed from glass (cohesive failure) |

TABLE 6

| Primer Composition | Adhesion to RYTON (PPS) Dry | Adhesion to RYTON (PPS) Wet (1 day boiling water) | Adhesion to PVIF Dry | Adhesion to PVIF Wet (1 day R.T. water) |
|---|---|---|---|---|
| None | poor | — | good | nil |
| Z-6032 (Comparative) Example | fair | poor | good | nil |
| 1 | fair | nil | — | — |
| 2 | poor | nil | — | — |
| 3 | exc. | poor | — | — |
| 4 | exc. | nil | exc. | nil |
| Example 1 | exc. | fair | exc. | exc. |
| Example 2 | exc. | exc. | exc. | exc. |
| Example 4 | exc. | exc. | exc. | exc. |
| Example 5 | fair | poor | exc. | exc. |
| Example 6 | exc. | poor | exc. | exc. |
| Example 10 | exc. | exc. | exc. | exc. |

In addition to these results, it was found that the primer compositions of Examples 4 and 10 (based on the composition of (Comparative) Example 1 and either 3-aminobenzoic acid or 2-aminobenzoic acid, respectively) were particularly effective as primers on cold-rolled steel, stainless steel, and aluminum for powder-coated RYTON.

Poly(vinyl acetate) adhesive compositions modified with 1.5% (including solvent) of the primers listed in Table 7 were prepared by thoroughly mixing each primer with RES 6212 PVAc emulsion. These mixtures were used to form laminates from 1 inch wide x 3 inch long x ⅛ inch thick strips of plywood. In this procedure, two such strips were butted end-to-end on a flat surface and a third strip, previously coated with one of the adhesive compositions, was placed symmetrically over the butt joint so as to provide two lap joints having a total adhesive contact area of 1×3=3 square inches. clamped in a vise and air dried at room temperature for 24 hours and then stored at R.T. for 4 days. After drying, any excess adhesive in the butted region was removed by carefully sawing through the butted area just up to the top wood strip. The laminates were then soaked in water at 65° C. for 24 hours. These laminates were tested immediately after the water soak (i.e., while still wet) by pulling the two butted wood strips apart by hand. Shear adhesion strength was estimated on the basis of the percentage of wood failure on a scale of 1 to 10, the latter being the ultimate strength of the plywood and the former being the strength of the control adhesive containing no primer.

TABLE 7

| Primer Composition Primer Composition in RES 6212 Adhesive | Amount of Primer in Adhesive (%) Including Solvent) | Shear Strength After Water Soak (Relative Rank) |
|---|---|---|
| None | 0 | 1 |
| Z-6030 | 1.5 | 4 |
| SILANE A | 1.5 | 5 |
| SILANE B | 1.5 | 5 |
| Example 1 | 1.5 | 7 |
| Example 2 | 1.5 | 5 |
| Example 4 | 1.5 | 5 |

The primer compositions of the present invention performed as well as or better in this bonding application than prior art silane Z-6030 and newly disclosed SILANE A and SILANE B. The latter two materials are particularly suitable primers for inclusion in poly(vinyl acetate) formulations used in bonding wood, as described in a copending application of Witucki et al., Ser. No. 125,438, filed Nov. 25, 1987, now U.S. Pat. No. 4,818,779.

Examples 10-17

Additional primer compositions of the present invention were prepared by mixing 80 parts of the composition of (Comparative) Example 1 with 20 parts of the difunctional organic compounds indicated in Table 8. These mixtures were diluted with methanol (cold blended) to form 50% clear solutions therein.

Example 18

In a manner similar to the procedure of Examples 10-17, 80 parts of the composition of (Comparative) Example 2 was mixed with 20 parts of 3-aminophenol and diluted with methanol to form a 50% solution.

TABLE 8

| Example | Difunctional Organic Compound |
|---|---|
| Example 10 | 3-aminophenol |
| Example 11 | 3-aminobenzoic acid |
| Example 12 | 1,4-diaminobenzene |
| Example 13 | 1,3-dihydroxybenzene (resorcinol) |
| Example 14 | 2-hydroxybenzoic acid (salicylic acid) |
| Example 15 | 4-hydroxybenzoic acid |
| Example 16 | 1,4 dihydroxybenzene (hydroquinone) |
| Example 17 | 2-aminobenzoic acid |
| Example 18 | 3-aminophenol |

The above primer compositions were applied to microscope slides, as before, and allowed to dry at room temperature for about 15 minutes. Polymer films shown in Table 9 were fused or cured onto the primed slides at the indicated temperatures. The composites were then soaked in boiling water (70° C. water in the case of the PVC plastisol) and tested periodically by attempting to loosen the film with a razor blade.

For comparison, the composition of (Comparative) Example 1 was also diluted to 50% in methanol and used to prime slides. Primers were rated according to the length of time the film retained adhesion according to the following scheme (as reported in Table 9):

TABLE 9

| | Adhesion Rating with the Indicated Polymer | | | | | | |
|---|---|---|---|---|---|---|---|
| Primer Composition | PVC Plastisol @ 175° C. | PVIF Latex @ 230° C. | KERAMID[1] @ 250° C. | PEEK[2] @ 300° C. | RYTON @ 300° C. | Epoxy[3] @ R.T. | [4]Poly- sulfide @ R.T. |
| Example 10 | ++ | − | + | + | + | ++ | ++ |
| Example 11 | − | − | ++ | ++ | ++ | − | − |
| Example 12 | − | + | + | − | − | ++ | − |
| Example 13 | + | + | ++ | − | ++ | + | ++ |
| Example 14 | + | + | ++ | − | ++ | − | ++ |
| Example 15 | − | + | ++ | − | ++ | − | + |
| Example 16 | − | + | ++ | + | + | + | ++ |
| Example 17 | − | + | ++ | ++ | + | + | ++ |
| Example 18 | +++ | − | + | + | + | ++ | ++ |
| (Comparative) Example 1 | − | − | − | − | + | − | ++ |

−not recommended (but better than control using no primer at all);
+good (as much as 100-fold improvement over control);
++very good (up to 1000-fold improvement over control);
+++outstanding (best of the series evaluated)
[1]KERAMID is a polyimide product of Rhone-Poulanc, Inc.,Monmouth Jct., NJ.
[2]PEEK is polyetheretherketone (VITREX; ICI Americas, Inc., Willmington DE).
[3]Epoxy is DER 331 (Dow Chemical Co., Midland, MI), cured at room temperature with 10% DMP-30 (Rohm and Haas).
[4]Polysulfide is PR944-F (Product Research and Development, Glendale, CA), cured at room temperature.

It is seen from Table 9 that the primer compositions of the present invention show "very good" results in many polymers, while the prior art composition, (Comparative) Example 1, provides such performance only in the case of the polysulfide system.

That which is claimed is:

1. A primer composition comprising:
   (A) from about 1 to 25 parts by weight of an organosilicon compound selected from the group consisting of 3-glycidoxypropyltrimethoxysilane, 3-mercaptopropyltrimethoxysilane, 2-mercaptoethyltrimethoxysilane, 2-(3,4-epoxycyclohexyl)-ethyltrimethoxysilane and partial hydrolyzate thereof;
   (B) from about 99 to 75 parts by weight of an alkoxymethyltriazine which is a product of etherification of a methyloltriazine with a monohydric alcohol having fewer than 5 carbons; and
   (C) a difunctional aromatic compound selected from the group consisting of 1,4-diaminobenzene, resorcinol, salicylic acid, hydroquinone, 4-hydroxybenzoic acid and isomers of aminobenzoic acid, said difunctional aromatic compound constituting from about 10 to 50 parts by weight for each 100 parts by weight of said organosilicon compound (A) and said alkoxymethyltriazine (B) in said composition.

2. The composition according to claim 1 further comprising a compatibilizing solvent (D).

3. The composition according to claim 2, wherein said organosilicon compound is gamma-glycidoxypropyltrimethyoxysilane.

4. The composition according to claim 3, wherein said alkoxymethyltriazine is highly etherified.

5. The composition according to claim 4, wherein said alkoxymethyltriazine is hexamethoxymethylmelamine.

6. The composition according to claim 5, wherein said difunctional aromatic compound is an isomer of aminobenzoic acid.

7. The composition according to claim 6, wherein said compatibilizing solvent (D) is selected from the group consisting of methanol and linear alcohols having 8 to 10 carbon atoms.

8. The composition according to claim 7, wherein said primer composition contains from 5 to 20 parts by weight of (a) said gamma-glycidoxypropyltrimethoxysilane, from 95 to 80 parts by weight of (b) said hexamethoxymethylmelamine and, based on 100 parts of (a) and (b), from 10 to 50 parts by weight of said isomer of aminobenzoic acid, the proportions recited being taken on a solids basis.

9. In a method of coating a solid substrate with a primer composition to promote adhesion of a polymer to said substrate, the improvement comprising using as said primer the composition of claim 1.

10. In a method of coating a solid substrate with a primer composition to promote adhesion of a polymer to said substrate, the improvement comprising using as said primer the composition of claim 2.

11. In a method of coating a solid substrate with a primer composition to promote adhesion of a polymer to said substrate, the improvement comprising using as said primer the composition of claim 3.

12. In a method of coating a solid substrate with a primer composition to promote adhesion of a polymer to said substrate, the improvement comprising using as said primer the composition of claim 4.

13. In a method of coating a solid substrate with a primer composition to promote adhesion of a polymer to said substrate, the improvement comprising using as said primer the composition of claim 5.

14. In a method of coating a solid substrate with a primer composition to promote adhesion of a polymer to said substrate, the improvement comprising using as said primer the composition of claim 6.

15. In a method of coating a solid substrate with a primer composition to promote adhesion of a polymer to said substrate, the improvement comprising using as said primer the composition of claim 7.

16. The method of claim 15, wherein said polymer is selected from the group consisting of poly(phenylene sulfide), poly(vinyl chloride), poly(vinyl acetate), polyacrylates, polycarbonates, polyetheretherketone and polyimides.

17. In a method for improving the adhesion of a polymer to an unprimed substrate comprising adding a primer composition to said polymer, the improvement comprising using as said primer the composition of claim 1.

18. In a method for improving the adhesion of a polymer to an unprimed substrate comprising adding a primer composition to said polymer, the improvement comprising using as said primer the composition of claim 2.

19. In a method for improving the adhesion of a polymer to an unprimed substrate comprising adding a primer composition to said polymer, the improvement comprising using as said primer the composition of claim 3.

20. In a method for improving the adhesion of a polymer to an unprimed substrate comprising adding a primer composition to said polymer, the improvement comprising using as said primer the composition of claim 4.

21. In a method for improving the adhesion of a polymer to an unprimed substrate comprising adding a primer composition to said polymer, the improvement comprising using as said primer the composition of claim 5.

22. In a method for improving the adhesion of a polymer to an unprimed substrate comprising adding a primer composition to said polymer, the improvement comprising using as said primer the composition of claim 6.

23. The method of claim 22, wherein said polymer is selected from the group consisting of poly(vinyl chloride) plastisols, plasticized poly(vinyl chloride), and rigid poly(vinyl chloride).

* * * * *